United States Patent [19]
Civanlar et al.

[11] Patent Number: 5,996,021
[45] Date of Patent: Nov. 30, 1999

[54] INTERNET PROTOCOL RELAY NETWORK FOR DIRECTLY ROUTING DATAGRAM FROM INGRESS ROUTER TO EGRESS ROUTER

[75] Inventors: Seyhan Civanlar, Middletown Township; Vikram R. Saksena, Freehold, both of N.J.

[73] Assignee: AT&T Corp, New York, N.Y.

[21] Appl. No.: 08/859,315

[22] Filed: May 20, 1997

[51] Int. Cl.$^6$ .............................. G06F 13/00; H04Q 11/04
[52] U.S. Cl. ............................................ 709/238; 370/392
[58] Field of Search ..................................... 370/389, 392, 370/351, 352, 357; 395/200.66, 200.68, 200.69, 200.7, 200.71, 200.72, 200.73, 200.74, 200.75; 709/238, 242, 243, 244

[56] References Cited

U.S. PATENT DOCUMENTS

| | | | |
|---|---|---|---|
| 4,736,363 | 4/1988 | Aubin et al. | 370/400 |
| 5,408,469 | 4/1995 | Opher et al. | 370/399 |

OTHER PUBLICATIONS

Watanabe et al. "ATM–based cut–through forwarding engine for computer communication networks", Global Telecommunications Conference, 1997, GLOBECOM '97, IEEE, v3 pp. 1476–1480.

*Primary Examiner*—Dung C. Dinh

[57] ABSTRACT

An internetwork relay system and method for transmitting IP traffic including an edge and a core. The edge includes an ingress and egress routers and the core includes a switch network. The ingress router communicates with and receives an IP packet from a source network. The ingress router attaches to each IP packet, a globally unique label which is used to forward the IP packet across the network. The relay switch network communicates with the ingress router, receives the IP packet from the ingress router and forwards the IP packet along its transmission path based on destination information included in its attached label. The egress router receives the IP packet from the switch network and forwards it to a destination network. Once received, the destination network forwards the IP packet to its intended destination.

44 Claims, 3 Drawing Sheets

INTERNET PROTOCOL RELAY NETWORK FOR DIRECTLY ROUTING DATAGRAM FROM INGRESS ROUTER TO EGRESS ROUTER

BACKGROUND OF THE INVENTION

1. Field of the Invention

The present invention relates generally to communication systems and more particularly to an internetwork protocol relay network that allows for the transmission of Internet protocol traffic faster and/or more efficiently than existing schemes.

2. Description of Related Art

In a data communication network, such as the internetwork ("Internet"), information in the form of Internet Protocol ("IP") datagrams or packets are sent from a source to a destination. These datagrams are sent over the Internet by way of an "IP backbone" which is a high-speed, high performance network that links other networks together. The source and destination of a datagram can be, for example, the personal computers of two different users. Typically, a datagram, traverses many different routers on its transmission path from a source to its intended destination. A router is simply a host computer that forwards network traffic from one connected network to another regardless of whether or not the source and destination networks are of the same type. When a router receives a datagram, it reads the address of the destination host to determine to which router the datagram should be forwarded. It then replaces the address of the present router with the address of the next router in the datagram's address header before forwarding the datagram along its transmission path. This is generally known as "Layer 3" processing which refers to the network layer of either the Open Systems Interconnection (OSI) seven-layer model or to the Transmission Control Protocol/Internet Protocol (TCP/IP) model. This router-to-router "hop", also known as a "hop by hop" process, continues until the datagram reaches the router to which its destination is connected and the datagram is successfully delivered. The path of an IP datagram across the Internet traverses many routers until it reaches its destination, each of these routers performing Layer-3 processing on the datagram. This processing scheme is generally referred to as the "Classical IP" system or model. A disadvantage associated with this system is that the hop-by-hop transmission process and the associated Layer-3 processing at each router contributes to significant and unpredictable delays in the transmission of IP packets across a network.

Another network protocol system known as "Classical IP Over ATM" is the most commonly known processing model to support IP traffic over ATM (Asynchronous Transfer Mode) networks and was recently defined by the IETF (Internet Engineering Task Force). FIG. 1 illustrates a schematic view of this type of network. By way of example, source host 10 wishes to send a packet to destination host 20 which is outside the local IP subnet ("LIS") of the source host 10. First, the source host 10 sends the packet to router 11 across ATM switch 12 designated in FIG. 1 as path-1. Establishment of path-1 over the ATM network is accomplished by source host 10 translating the IP address of router 11 to an ATM address in order to build a virtual path to router 11. The Classical IP Over ATM model provides ARP (Address Resolution Protocol) server 13 which performs an IP to ATM address translation for all registered hosts and routers within a logical IP Subnet (LIS). In this example, source 10 sends an address resolution request to ARP server 13 for the ATM address corresponding to the IP address of router 11 in the same LIS. In turn, ARP server 13 sends an address resolution response with information associated with the ATM address corresponding to router 11. Thereafter, source 10 builds path-1 across the ATM network to the ATM address of router 11. In turn, router 11 makes a determination that the next hop for transmission of the packet is router 14 and forwards the packet to router 14, across ATM switches 12 and 15, designated as path-2, discovering router 14's ATM address using ARP server 16. Similarly, router 14 forwards the packet through ATM switches 15 and 17, designated as path-3 in FIG. 1, to router 17 using ARP server 19. Router 17 in turn makes a determination that it is the last hop router on the path to destination 20. Router 17 sends the packet to destination 20 across ATM switch 18 designated as path-4 in FIG. 1 using ARP server 21.

Although this type of network maintains traditional IP switching on top of an ATM network, it views the underlying ATM network as just another OSI Layer-2 technology, and thus does not fully capitalize on the benefits of ATM. In addition, the IP routers 11, 14, and 17 and the ATM switches 12, 15, and 18 run separate protocols to determine the address of the next hop making this type of network configuration less efficient. Moreover, each router along the packet's transmission path determines the next hop router toward its destination. This requires each router to perform Layer-3 processing on the packet to inspect the destination IP address and derive the next hop router from routing tables determined by a routing protocol and stored in each router. Furthermore, this system also includes IP to ATM address mapping steps, one in each ARP server, and four ATM switched virtual path (SVC) establishment steps along the path between the source host 10 and destination host 20, thereby adding more processing steps to the routing scheme.

A number of additional network protocol software schemes have attempted to speed-up and increase the efficiency of Internet transmissions. These systems can generally be classified into two groups; the systems in the first group attempt to reduce the amount of Layer-3 processing at intermediate routers; and the systems in the second group attempt to reduce or eliminate the number of router hops in a datagram's path. A brief overview of the types of systems in each group follows.

A network processing scheme, known as the "Classical IP Model-Cut Through Routing", attempts to completely eliminate router hops, however this system is only available in situations where there is a large IP data flow from one particular end point to another. This type of processing system is schematically shown in FIG. 2. In this system for example, source host 30 determines the ATM address corresponding to the IP address of destination host 40 and establishes a cut-through path, or a virtual circuit from the source host 30 to the destination host 40 thereby avoiding routers 41, 42 and 43. Thus, the cut-through path for a datagram is defined from source host 30 through ATM switch 31 through ATM switch 32 through ATM switch 33 to destination host 40.

In order to establish the cut-through path from source 30 to destination 40, the source 30 must have acquired the address for destination 40 by sending a packet via the Classical Hop-by-Hop Network. Presently, IETF is studying a new address resolution protocol called Next Hop Routing Protocol (NHRP) which allows IP to ATM address mapping across LISs so that cut-through paths across ATM networks can be established. In the NHRP model, Next Hop Servers (NHS) 34, 35, and 36 are employed per LIS, or per multiple LISs, similar to the ARP servers in the Classical Hop-By-Hop network. The key difference between an ARP server and an NHS is that an ARP server only communicates to its clients in a LIS, but an NHS may communicate with its own hosts as well as its neighbor NHSs supporting other LISs.

In this configuration source host 30 connected to ATM switch 31 becomes an NHRP client when it registers its IP-ATM address with its specified NHS 34, similar to the ARP server in the classical Hop-by-Hop network. NHS 34 can be stored in Router 41 or in ATM switch 31. When an NHRP client, such as source host 30, desires to switch its data traffic from the default (hop-by-hop) routed path to a cut-through path, it must first acquire the address of destination host 40 by way of a request/response process. This process begins by source host 30 sending an NHRP request to NHS 34 stored in router 41 via path-1a to obtain the mapping of the IP address of destination 40 to its corresponding ATM address. NHS 34 receives the request and either has the address mapping in its database because destination 40 is in the same LIS, or because it learned the address mapping from a previous address resolution request/response process and cached the address of destination host 40. However, if NHS 34 does not have the address of destination 40, it must forward the NHRP request to NHS 35 stored in router 42 via path-2a. This process continues to NHS 36 stored in router 43 via path-3a which is the last NHS on the transmission path to the destination 40 via path-4a. The NHRP response which carries the ATM address of destination 40 follows the reverse path back to source 30 and gets forwarded to source host 30 by NHS 34. Thereafter, source host 30 builds a virtual path to the destination without going through routers 41, 42 and 43 along the transmission path between source 30 and destination 40. Thus, to establish the address mapping for a cut-through path between source 30 and destination 40, a request/response process using Layer-3 processing at each router, substantially similar to the hop-by-hop process, must be performed at least once.

Although the NHRP process, once established, avoids router hopping and the associated Layer-3 packet processing, there are only a limited number of cut-through virtual circuits that can be established over an ATM switching network. This disadvantage is known as Virtual Circuit Explosion which occurs when the number of simultaneous virtual circuits through an ATM switching network becomes unmanageably large due to IP traffic. Moreover, because the typical datagram is relatively small, this request/response process needed to establish the path between source 30 and destination 40 usually satisfies the transmission requirements between a source and destination for that particular communication sequence making a cut-through path between them no longer necessary. Moreover, NHRP has applicability only to ATM networks and is more suited for large data transmissions rather than the standard IP packet size.

Another software routing scheme known as IP Navigator combines Wide Area Network (WAN) switching and IP routing to store the end destination switch, the switch which communicates with an egress router, for each IP packet sent over the network. In this manner, switches within the network function as IP routers. Once the end destination switch is determined, the IP packet is forwarded through a pre-established "multipoint-to-point tunnel" to that switch. Multipoint-to-point tunneling is a method by which once a virtual circuit or cut-through is established, the address information is broadcast to all other nodes in the network. Once at the end destination switch, a routing table lookup is performed to determine the proper egress port of the end switch to forward the IP packet. Similar to the cut-through routing scheme, this software model has applicability only to ATM networks and suffers from the Virtual Circuit Explosion problem.

The Classical IP with Cut-Through Routing and the IP Navigator schemes attempt to reduce, or sometimes eliminate the number of router hops for the transmission of an IP packet across a network. However, Layer-3 processing remains a substantial part of these networks. Thus, a need exists to reduce the number of router hops along a datagram's transmission path while also reducing the amount of Layer-3 processing at each hop.

Tag-switching and IP-switching are examples of two network schemes that attempt to reduce the amount of Layer-3 processing at intermediate routers. However, each of these network systems do not reduce the number of router hops in the path of an IP datagram. Tag-switching is an IETF proposal that inserts a so called "tag" or a shim layer between the Layer-2 (Data Link Layer) and the Layer-3 (Network Layer) of the OSI model. If the data link layer is ATM, tag switching proposes to use some portion of the Virtual Path Identifier (VPI) and Virtual Circuit Identifier (VCI) of the 53 byte ATM cell header as the tag. Each IP router between the source and destination inspects the inserted tag and makes a determination, based on local look-up tables, which port to forward the IP datagram. Each router establishes a table entry in its database indicating that for a particular tag, the datagram originates from a first router and should be forwarded onto a particular port to a second router. In addition, the first router performs a call setup function where the first router informs the second router on the path, by a "tag distribution protocol," that the incoming IP traffic to be forwarded to the second router has a particular tag identifier. This process continues with each router inspecting the tag, determining which downstream router to forward the datagram to, replacing the existing tag with another tag that denotes the address of the next downstream router, and forwarding the datagram accordingly until it reaches its destination. Again if the data link layer is ATM, each router inspects the VPI/VCI value at the packet's header to make a forwarding decision. The tag switching involves swapping VPI/VCI values between incoming and outgoing ports of each router on an IP packet's transmission path. Although Tag-switching illustrates a network that attempts to reduce the amount of Layer-3 processing on an IP datagram, the number of router hops on a transmission path remains unchanged.

Another system known as IP-switching, used only in ATM networks, also attempts to limit the amount of Layer-3 processing performed on an IP packet during transmission. The general concept of IP-switching is similar to Tag-switching, however IP-switching does not use the ATM signaling and call set-up process used in Tag-switching. The ATM switches are used simply to relay the IP datagrams in 53 octet chunks with a short tag attached to each packet which includes various VPI/VCI values, the use of which are determined locally by each router. Both Tag and IP-switching schemes reduce the amount of processing on each IP datagram by manipulating the tags, however the number of router hops is not reduced. Although in both IP and Tag-switching each intermediate hop is a router, the router does not make the appropriate layer-3 header modifications such as incrementing the hop count and changing the originator's IP address. Furthermore, even though the Layer-3 processing is eliminated in some if not all the routers, the tag swapping still requires each router to parse the header of the IP packet to identify the tag and to write on the packet header to swap the tag.

As an alternative to the above referenced models, a variant of IP switching can be used in conjunction with NHRP. Such a system has been proposed by the inventors of the present application in their copending U.S. patent application Ser. No. 08/728,276 entitled "Internet NCP-Over ATM" filed on Oct. 8, 1996 incorporated herein by reference now U.S. Pat. No. 5,828,866.

None of the above described systems both reduces the number of router hops an IP packet experiences as it traverses a network while also reducing the amount of Layer-3 processing in each hop. As many more routers and Web servers are being deployed, a high-speed Internet backbone is needed more than ever to allow network growth and to improve data transmission performance.

SUMMARY OF INVENTION

The present invention meets the needs and avoids the disadvantages and drawbacks of the above described network schemes and processes by providing an internetwork relay system and method for transmitting IP traffic that reduces the number of router hops an IP packet makes during transmission over the network and also reduces the amount of Layer-3 processing performed on each IP packet as it traverses the network.

In one embodiment of the present invention, a relay network includes an ingress router which communicates with and receives an IP packet from a source network. The ingress router attaches a globally unique label to each IP packet. The label is used to forward the IP packet across the network. A relay switch network communicates with and receives the IP packet from the ingress router based on information included in the label. The switch network forwards the IP packet along its transmission path based on destination information included in its attached label. An egress router receives the IP packet from the switch network and forwards it to a destination network. Once received, the destination network forwards the IP packet to its intended destination.

In another embodiment of the present invention, a relay network includes an ingress router which communicates with and receives an Internet protocol datagram form a source network. The ingress router attaches to the datagram a label that includes information corresponding to the datagram's intended destination. The datagram is forwarded to a switch network from the ingress router. The switch forwards the datagram to an egress router such that the egress router is one router hop away from the ingress router.

DETAILED DESCRIPTION

Figure 1:
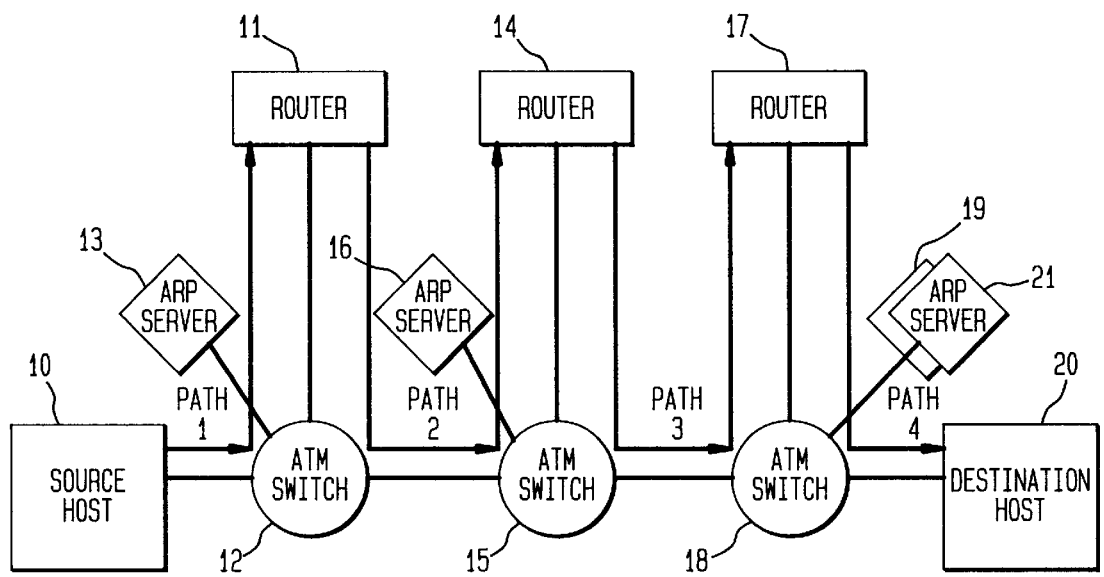
FIG. 1 is a block diagram of a classical IP over ATM network.
Figure 2:
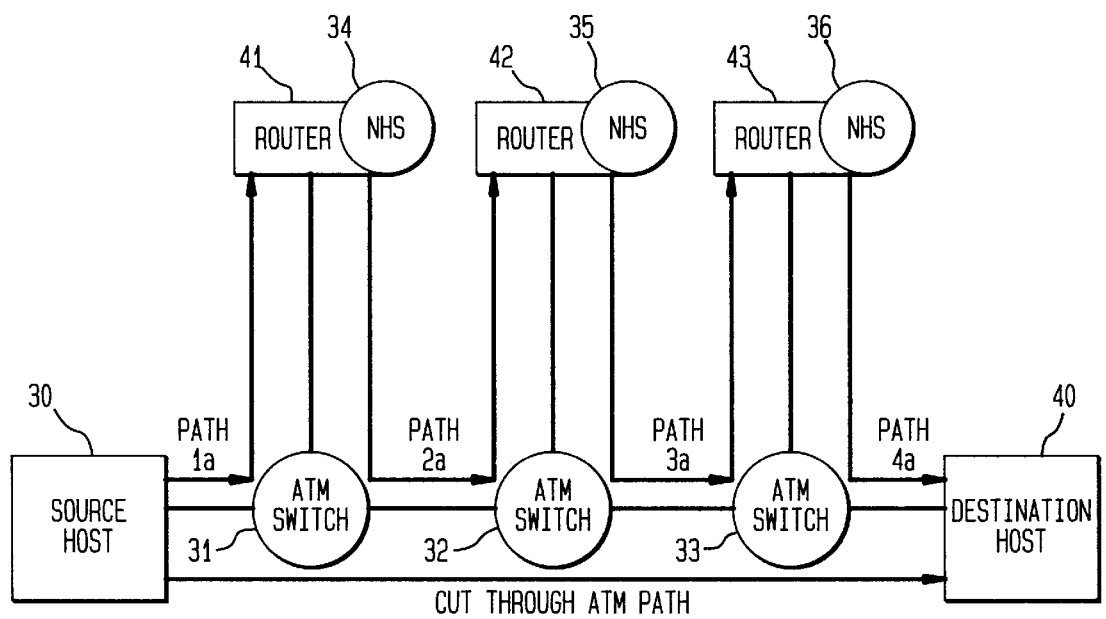
FIG. 2 is a block diagram of an IP network with cut through routing.
Figure 3:
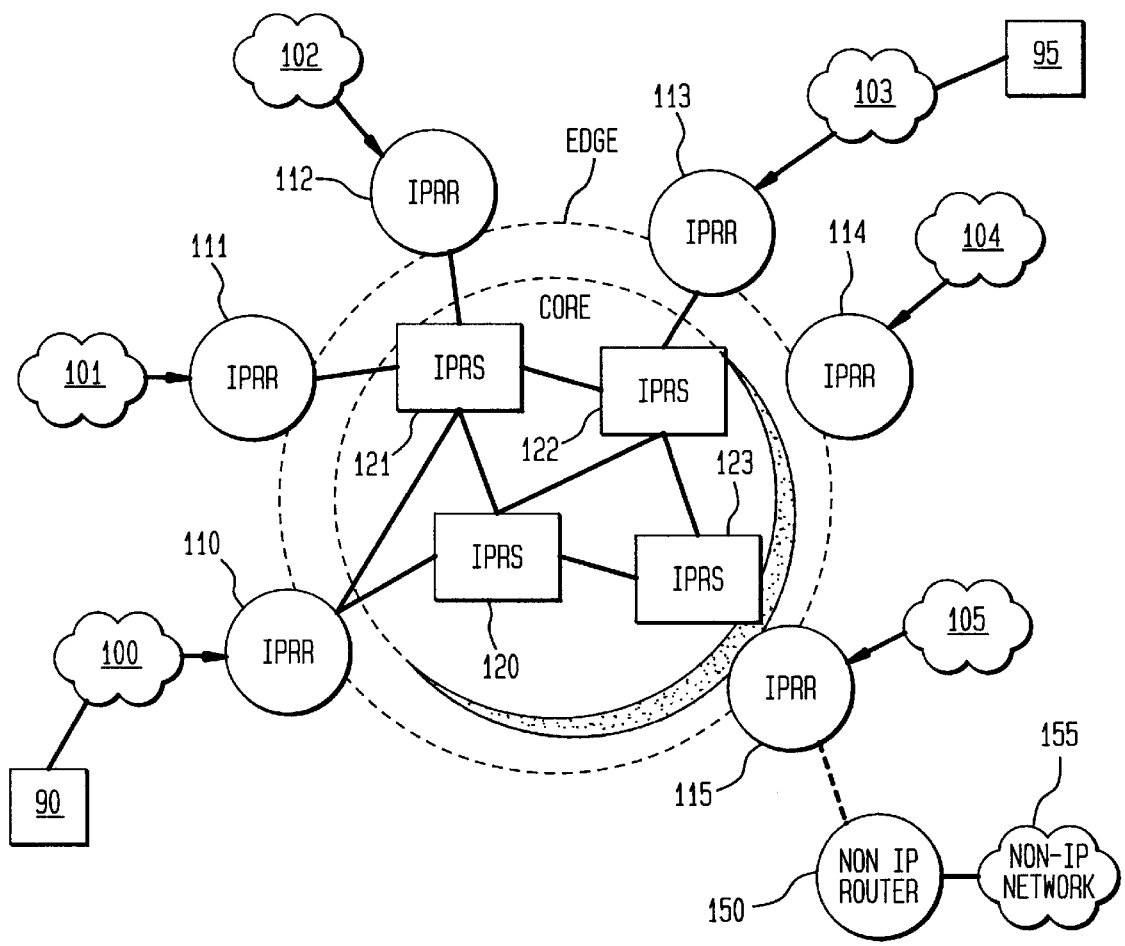
FIG. 3 is a schematic view of a Relay Network in accordance with the present invention in which a plurality of routers define the edge of the Network and a plurality of switches define the Network's core.
Figure 4:
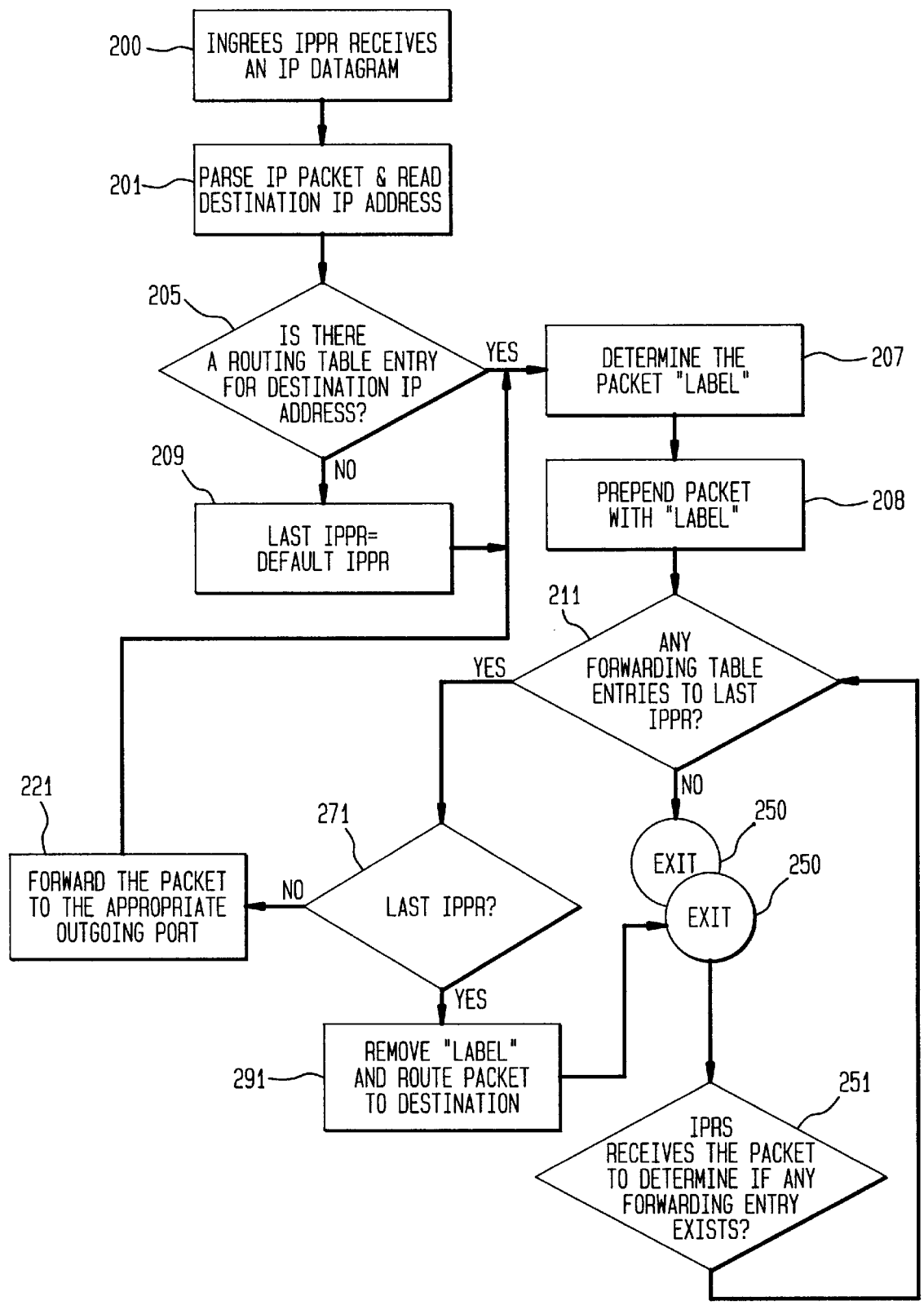
FIG. 4 illustrates the processing flow of an IP datagram as it traverses the Relay Network shown in FIG. 3.

Referring first to FIG. 3, the principles of the present invention are illustrated in this simplified functional view of an IP Relay Network interconnecting Local Area Networks ("LAN") or IP Networks 100–105, IP Relay Routers ("IPRR") 110–115 and IP Relay Switches ("IPRS") 120–123. IPRR's 110–115 form the "edge" of the network and IPRS's 120–123 form the "core" of the network providing connectivity among the IPRR's. LAN's 100–105 represent groups of users typically located within close proximity to one another and connected together to form a network. Although FIG. 3 illustrates a particular configuration of the present IP Relay Network having a distinct number of routers, switches and IP Networks/LANs, it is understood that the size of the network is not limited by the number of components nor by the interconnection between these components.

As shown in FIG. 3, LAN's 100–105 communicate with IPRR's 110–115, respectively. However, a particular LAN may also communicate with one or more IPRR's depending on the network configuration. Each IPRR 110–115 is a multihomed host that receives IP packets addressed to itself or if an IP packet is addressed to another host, each IPRR forwards the packet to another router via one or more IPRS's 120–123 within the relay network. Each IPRR 110–115 performs Layer-3 processing on each IP packet received. Layer-3 processing generally refers to the parsing-out and reading of the IP address included in the header portion of each IP packet. The information contained in this address header includes the source IP address and the destination IP address. Each IPRR 110–115 examines the destination address and compares it to its own network IP address. If the destination and source addresses are on the same LAN, then the IP packet is routed directly to the host with that destination address. If the destination address is not attached to the same LAN, one of the IPRR's 110–115 which communicates with the LAN forwards the IP packet to a particular IPRS 120–123 based on information contained in a routing table the details of which will be described in more detail below.

The IPRR that receives the IP packet from a LAN for transmission over the network is known as the "ingress" IPRR. Based on the information contained in the address header of a particular IP packet, the ingress IPRR attaches, at the network layer (Layer-3), a fixed length header referred to as a "label". This label will be read by one or more IPRS's 120–125 as the IP packet is forwarded over the network toward its destination. When an IPRS receives an IP packet from the ingress IPRR, its function is to forward the packet towards a destination or "egress" IPRR that communicates with a LAN connected to the destination host. The IPRS may forward the IP packet to another IPRS on the transmission path or to an egress router depending on the packet's intended destination. An IPRR can be physically connected to more than one IPRS. In this case the last IPRS in the transmission path of an IP packet is the one that lies on the optimal path to the egress IPRR as determined by the routing algorithm.

The label attached to each IP packet by an ingress IPRR has significance in that certain portions of the label identify certain components or groups of components of the Relay Network. This concept is similar to a telephone number in that a three digit area code designates in what part of the country a phone is located, the three digit exchange indicates a region within the area code, and the last four numbers specify a particular line within the exchange. Unlike existing network protocol systems where packet routing information may comprise random identifiers, the label in the present Relay Network possesses information corresponding to where within the Network a destination is located. For example, the first part of the label may indicate which IPRS or group of IPRS's within the network the IP packet is intended. Another portion of the label may indicate which port on the IPRS the packet should be sent to, or in other words, which egress IPRR.

Each IPRS is a data link or Layer-2 device in that it reads the label attached to each IP packet and determines the next stop, either another IPRS or an egress router, for the IP packet along its transmission path. Once the IP packet is received by an egress router, the label is removed and the IP packet is forwarded to its destination. Unlike Tag and IP-switching schemes, an IPRS in accordance with the present invention does not modify or swap the label attached to an IP packet as the packet is forwarded along its transmission path. Accordingly, the forwarding operation of the IPRS's is amenable to high speed hardware implementations thereby achieving large forwarding rates and through-puts required by Internet and Intranet applications.

The above general overview is best understood by way of the following example which is used for illustrative purposes and is not intended to limit the scope and spirit of the invention. A source host 90, such as a personal computer, connected to LAN 100 sends an IP packet to destination host 95, also a personal computer, connected to LAN 103. The IP packet is transmitted from host 90 through LAN 100 to IPRR 110 in a conventional manner. IPRR 110, considered the ingress IPRR, reads the address header in the IP packet and determines that the destination host is not attached to a LAN to which IPRR 110 can deliver the packet directly. IPRR 110 performs Layer-3 processing on the IP packet, as well as attaching a label to the IP packet based on information included in a routing table stored in a memory device in IPRR 110 indicating that the next hop router is IPRR 113, considered the egress IPRR. In this manner, ingress IPRR 110 views egress IPRR 113 as being only one hop away.

The IP packet is forwarded to IPRS 120 which may be, for example, an ATM switch. This forwarding process is performed by mapping the address information stored in IPRR 110's routing table with address information stored in a forwarding table also stored in IPRR 110. IPRS 120 reads the label and forwards the IP packet to IPRS 122 based on information stored in a forwarding table at IPRS 120 corresponding to egress IPRR 113. IPRS 122 also reads the label and forwards the IP packet to egress IPRR 113 based on information stored in its forwarding table corresponding to egress IPRR 113. Egress IPRR 113 receives the IP packet, performs Layer-3 processing to reassemble the packet, and forwards it through LAN 103 to destination host 95.

The IP Relay Network in accordance with the present invention can accommodate several different label formats attached to an IP packet by an ingress IPRR. In one version of the label, identification information corresponding to the egress IPRR (IPRR ID) is used. Alternatively, the label may include identification information corresponding to the last IPRS (IPRS ID) that communicates with the egress IPRR and the IPRS port (PORT ID) on which the egress IPRR communicates. In addition, a FLOW ID may also be included in the label to differentiate between multiple IP packets bound for the same destination. This allows IPRSs along the IP packet's transmission path to provide different quality of service treatment to different IP packets. For example, the FLOW ID can denote that a confirmation message indicating that the packet has been received needs to be sent back to the source. In addition, the FLOW ID may be used for routing IP packet traffic across multiple least-cost paths in the relay network.

The manner by which IPRRs 110–115 learn about what labels to attach to an IP packet for a given egress IPRR is based on extensions to standard IP routing protocols such as OSPF (Open Shortest Path First). IPRRs 110–115 and IPRSs 120–123 participate in a common routing and topology exchange protocol which not only distributes the usual IP routing and link state topology information, but also distributes the IPRS ID and PORT ID or alternatively the IPRR ID information for the entire network depending on which label version is employed. This protocol allows each IPRR 110–115 to construct its routing and forwarding tables which are stored in a memory device, or in different memory devices within each IPRR.

For a given destination IP address, the routing table stored in each IPRR 110–115 provides the label to be attached to the IP datagram. The routing table contains identification information corresponding to an egress IPRR for addressing each IP packet as opposed to only the next hop router address used in other network systems. The routing table stored in each IPRR 110–115 has the general structure illustrated in Table 1.

TABLE 1

| DESTINATION IP ADDRESS | FLOW ID | LAST IPRR ID | LAST {IPRS ID, PORT ID} |
| --- | --- | --- | --- |

Referring to Table 1, the Destination IP Address is obtained from reading the header address portion of an IP packet. The FLOW ID, as described above, is assigned locally by the ingress IPRR based on policies defined by the network administrator. The LAST IPRR ID identifies the egress IPRR to which the destination host communicates via a LAN The LAST {IPRS ID, PORT ID} is an optional field where the LAST IPRS ID refers to the IPRS that communicates with the egress IPRR and the PORT ID refers to the physical port that the egress IPRR is connected to via the last IPRS. Depending on the version of the label employed, the routing table stored in each IPRR maps the destination address of a particular IP packet to either the egress IPRR (LAST IPRR ID) or to the IPRS and physical port that communicates with the egress IPRR (LAST IPRS ID, PORT ID). By including the identification of the egress router in these routing tables, each IPRR has a complete knowledge of the routed network. As additional IPRRs are added to the relay network, the routing tables in each IPRR are dynamically updated through the use of a routing algorithm. The routing table stored within each IPRR contains the egress IPRR to en route to each Layer 3 destination as opposed to the next hop router.

Additionally, a default IPRR can also be implemented in the Relay Network in accordance with the present invention by designating one of the IPRRs 110–115 as the default IPRR. If the IP Relay Network is connected to a non-IP network, then the default IPRR will be considered the egress IPRR for traffic destined for such non-IP networks. The default IPRR performs the necessary Layer 3 processing on the IP traffic and forwards it to the first router of the non-IP Relay Network. For example, if a packet is sent from IP network 105 to non-IP network 155, IPRR 115 is considered the default IPRR and performs the necessary Layer 3 processing on the packet. The packet is then forwarded to non-IP Router 150 which in turn forwards it to its destination in non-IP network 155.

The forwarding table stored in each IPRR 110–115 has the general structure shown in Table 2.

TABLE 2

| EGRESS IPRR ID | LAST IPRS ID | PORT ID(1) | PORT ID(2) |
| --- | --- | --- | --- |

Referring to Table 2, the EGRESS IPRR ID identifies the egress IPRR to which the IP packet is forwarded. The LAST IPRS ID refers to the IPRS that is physically connected to the egress IPRR. The PORT ID fields have local significance depending on the particular IPRR and the destination of the IP Packet. The PORT ID(1) and PORT ID(2) fields refer to the port from the ingress IPRR onto which the IP packet is sent. In other words, the PORT ID (1) and PORT ID (2) fields indicate which IPRS the IP packet is forwarded to from the ingress IPRR. Two different PORT ID's, namely PORT ID(1) and PORT ID(2) can be used since there may be several alternate (least-cost) paths to an IP packet's destination. For example, the forwarding table in IPRR 110 may have a PORT ID(1) corresponding to IPRS 120 and a PORT ID (2) corresponding to IPRS 121. If the egress IPRR is IPRR 112, then ingress IPRR 110 can forward the packet to either IPRS 120 or IPRS 121 depending on the IP traffic currently being sent over the network which impacts the least-cost path to egress IPRR 112 for that particular IP packet. The IPRR may choose among these alternate ports available to route the IP packet to the egress IPRR based on its local algorithm.

Each IPRS 120–123 stores a forwarding table in memory, each of which has substantially the same structure as that shown in Table 2 above. The PORT ID (PORT ID (1) and PORT ID (2)) refers to the port on which the ingress IPRR should en route the IP datagram to the egress IPRR via the IPRS communicating with the egress IPRR. Similar to the different paths available to an ingress IPRR, PORT ID(1) and PORT ID (2) indicate alternative, least-cost paths to the next IPRS in an IP packet's transmission path. When an IPRS receives an IP packet, the IPRS reads the IPRS ID portion of the label and maps it to the LAST IPRS ID entry in its forwarding table to determine the outgoing PORT ID of the IPRS which is connected to either the next IPRS along the transmission path or to an egress IPRR depending on the packet's destination. Accordingly, the PORT ID field has local significance in that it denotes the port of an IPRS on which an IP packet is routed to the next IPRS or to an egress IPRR. Moreover, if PORT ID (2) is selected and load balancing is enabled, then the FLOW ID field is hashed to select the particular outgoing port on an IPRS. The FLOW ID field may also be used, for example, to differentiate between IP traffic requiring a secure path across the network denoted as FLOW ID (1) and a packet having a less secure path across the network denoted as FLOW ID (2). The use of a routing table in each IPRS avoids the need for any Layer-3 processing on an IP packet.

The forwarding table in each IPRS and IPRR are also dynamically updated based on the topology or link-state of the network. Thus, when the topology of the network changes by the addition or subtraction of IPRRs and/or IPRSs, the optimal paths across the core network may change and the forwarding tables change accordingly.

FIG. 5 illustrates the software processing flow of an IP datagram as it traverses an IP Relay Network in accordance with the present invention. The process begins in step 200 when one of the IPRRs 110–115, considered the ingress IPRR, receives an IP datagram from one of the end stations connected to a LAN or IP network 100–105. In step 201, the ingress IPRR parses the IP datagram and reads the IP address of the destination connected to a particular LAN 100–105. The IP address is contained in the header portion of the IP datagram. In branch 205, the ingress IPRR checks to determine if there is a routing table entry corresponding to the destination IP address for the IP packet received. If the result is YES, step 207 is performed and the ingress IPRR retrieves the routing table entry to determine the "label" to be attached to the IP packet. However, if the result in step 205 is NO, indicating that there is no routing table entry in the egress IPRR for the destination address, then the egress IPRR uses the table entry corresponding to the default router as the egress IPRR as shown in step 209 and the process proceeds to step 207 described above. In step 208, IPRR-100 attaches the label to the IP datagram using Layer-3 processing. In conditional branch point 211, IPRR-100 checks to determine if there is a forwarding table entry in its database for the LAST IPRR ID. If the test result is YES, it checks to determine if it is the last hop to the destination station in conditional branch point 271. If the test result is YES, then the IPRR removes the label and forwards the IP datagram to its final destination in step 291. The process exists in step 250.

If the test in step 271 is NO, indicating that the receiving entity is not the last IPRR, then it sends the IP datagram to its port identified by the PORT ID retrieved from the forwarding table in step 221. If the test result in step 211 is NO, indicating that there is no forwarding table entry for the egress IPRR, then the process exists in step 250.

In step 251, an IPRS 120–123 which receives the packet from the ingress IPRR determines if any forwarding entry exists in the forwarding table stored in its memory. If a forwarding table entry does exist then the IP datagram is forwarded to the next IPRS on its way to the egress IPRR. The process returns to step 211, where each IPRS on the transmission path determines if there is a forwarding table entry for the next IPRS. This process is reiterated for each IPRS along the path until the datagram is delivered.

What is claimed is:

1. An internetwork relay system for transmission of internet protocol traffic along a transmission path in a network from a source to a destination, said system comprising:

an ingress router communicating with said source and receiving said datagram from said source;

a globally unique label identifying said destination used to forward said datagram across said network, said label attached to said datagram at said ingress router;

a relay switch network communicating with said ingress router and receiving said datagram therefrom based on information included in said label, said switch network forwarding said datagram along said transmission path based on information included in said label; and an egress router receiving said datagram from said relay switch network and forwarding said datagram to said destination based on information included in said label.

2. The internetwork relay system of claim 1 wherein said relay switch network includes a plurality of relay switches, said switch network forwarding said datagram from said ingress router to said egress router such that said egress router is one router hop away from said ingress router.

3. The internetwork relay system of claim 2 wherein said label attached to said datagram is processed as read-only by each of said switches.

4. The internetwork relay system of claim 2 wherein each of said switches includes a forwarding table stored in a memory device, said forwarding table including routing information corresponding to said destination of said datagram, each of said switches reading said label, matching said destination information included in said label with said routing information contained in said forwarding table and forwarding said datagram along said transmission path toward said egress router based on said routing information.

5. The internetwork relay system of claim 1 wherein said ingress router includes a routing table stored in a memory containing said destination information and identification information corresponding to said egress router.

6. The internetwork relay system of claim 2 wherein one of said switches within said relay switch relay network communicating with said egress router along said datagram transmission path is an egress switch, said ingress router including a routing table stored in a memory device containing identification information corresponding to said egress switch.

7. The internetwork relay system of claim 6 wherein said routing table further includes identification information corresponding to a port on said egress switch through which said egress router communicates.

8. The internetwork relay system of claim 2 wherein said ingress router includes a forwarding table stored in a memory device containing identification information corresponding to said egress router.

9. The internetwork relay system of claim 2 wherein said ingress router includes a forwarding table stored in a memory device containing identification information corresponding to a port on said egress switch that communicates with said egress router.

10. The internetwork relay system of claim 2 wherein said ingress router includes a forwarding table stored in a memory device containing identification information corresponding to said egress switch.

11. The internetwork relay system of claim 5 wherein said routing table is updated dynamically upon the addition of a relay switch to said internetwork relay system.

12. The internetwork relay system of claims 6 wherein said routing table is updated dynamically upon the addition of a relay switch to said internetwork relay system.

13. The internetwork relay system of claim 6 wherein said routing table is updated dynamically upon the addition of a relay switch to said internetwork relay system.

14. The internetwork relay system of claim 5 wherein said routing table is updated dynamically upon the addition of an egress router to said internetwork relay system.

15. The internetwork relay system of claim 6 wherein said routing table is updated dynamically upon the addition of an egress router to said internetwork relay system.

16. The internetwork relay system of claim 7 wherein said routing table is updated dynamically upon the addition of an egress router to said internetwork relay system.

17. The internetwork relay system of claim 6 wherein said label includes identification information corresponding to said egress router.

18. The internetwork relay system of claim 6 wherein said label includes identification information corresponding to said egress switch and identification information corresponding to a particular port on said egress switch communicating with said egress router.

19. The internetwork relay system of claim 18 wherein said label further includes flow identification information for differentiating between multiple datagrams routed to the same destination.

20. The internetwork relay system of claim 18 wherein said label further includes flow identification information for balancing datagram traffic across multiple transmission paths.

21. The internetwork relay system of claim 1 wherein said switching network includes an asynchronous transfer mode switch.

22. The internetwork relay system of claim 1 wherein said ingress router attaches said label to said datagram using network layer processing.

23. The internetwork relay system of claim 1 wherein said egress router removes said label from said datagram using network layer processing.

24. The internetwork relay system of claim 1 wherein said label is partitioned to include information related to the location of said destination.

25. A method for transmitting Internet Protocol (IP) packets across a relay network, said packets originating from a source and forwarded to a destination, said method comprising the steps of:

receiving said IP packet from said source;

forwarding said IP packet from said source to an ingress router based on address information included in said IP packet;

parsing out said IP packet at said ingress router in order to read the address of said destination;

appending a unique label to said IP packet at said ingress router, said label including identification information related to the address of said destination;

forwarding said IP packet from said ingress router to a switching network; and forwarding said IP packet from said switching network to an egress router such that said ingress router is one router hop away from said egress router.

26. The method of claim 25 further comprising the step of removing said label from said IP packet at said egress router.

27. The method of claim 26 further comprising the step of reassembling said IP packet at said egress router.

28. The method of claim 25 further comprising the step of forwarding said IP packet from said egress router to said destination.

29. The method of claim 25 wherein said ingress router includes a routing table stored in a memory device, said routing table including address information corresponding to said egress router.

30. The method of claim 25 wherein said ingress router includes a routing table stored in a memory device, said routing table including address information for said switching network corresponding to said destination address.

31. The method of claim 30 wherein said routing table further includes identification information associated with a port of said switch network communicating with said egress router.

32. The method of claim 29 further comprising the step of including in said label, address information corresponding to said egress router, said address information contained in said routing table.

33. The method of claim 25 wherein said ingress router includes a forwarding table stored in a memory device, said forwarding table including address information related to said information corresponding to said destination address, said method further comprising the step of mapping said destination address to said address information corresponding to said egress router.

34. The method of claim 29 wherein said switch network includes a plurality of relay switches, each of said switches including a forwarding table, said table including information corresponding to said egress router.

35. The method of claim 34 wherein said forwarding table includes port identification information corresponding to a port in said switches communicating with said egress router.

36. The method of claim 29 further comprising the step of updating said routing table dynamically each time a router is added to said network.

37. The method of claim 30 further comprising the step of updating said routing table dynamically each time a router is added to said network.

38. The method of claim 33 further comprising the step of updating said forwarding table dynamically each time a router is added to the network.

39. The method of claim 34 further comprising the step of updating said forwarding table dynamically each time a switch is added to said network.

40. An internetwork relay system for transmission of internet protocol traffic along a transmission path, said system including a source network and a destination network, said system comprising:

an ingress router communicating with said source network and receiving an internet protocol packet from said source network;

a label attached to said packet at said ingress router, said label including information corresponding to said destination network;

a switch network communicating with said ingress router and receiving said packet therefrom, said switch network forwarding said packet based on destination information included in said label;

an egress router receiving said packet from said switch network such that said egress router is one router hop away from said ingress router, said egress router forwarding said packet to said destination network.

41. The system of claim 40 wherein said switch network includes a plurality of relay switches, each of said switches including a forwarding table, said table including information related to one or more of said plurality of switches located on said transmission path.

42. The system of claim 40 wherein each of said forwarding tables include information corresponding to said destination network.

43. The system of claim 42 wherein said label uniquely identifies said destination.

44. The system of claim 43 wherein said label is viewed by said switch network as read only.

* * * * *